(No Model.)
G. W. AMESBURY.
Cutter Head for Wood Working.
No. 238,074. Patented Feb. 22, 1881.
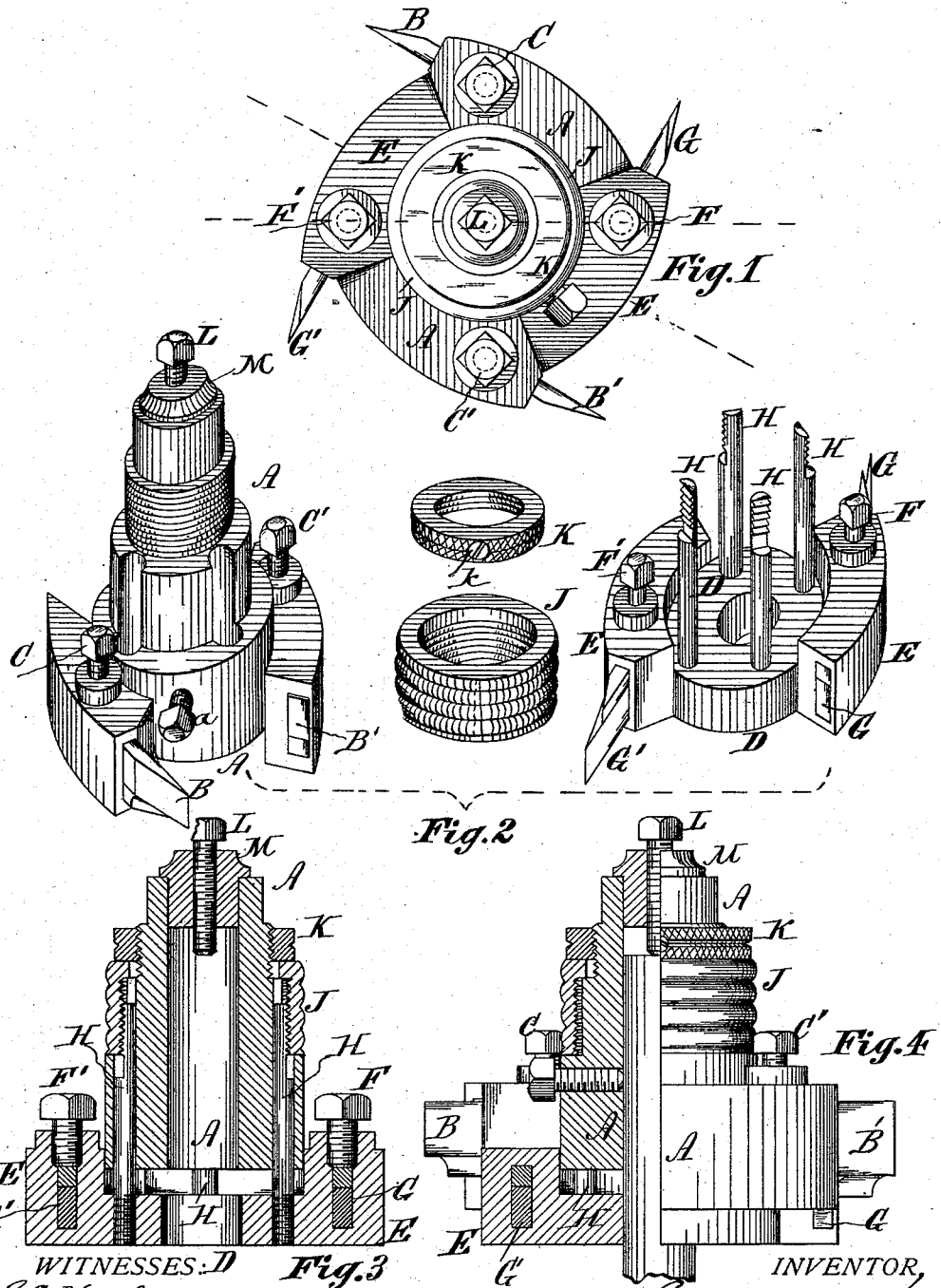
WITNESSES:
INVENTOR,
ATTORNEYS.

UNITED STATES PATENT OFFICE.

GEORGE W. AMESBURY, OF PHILADELPHIA, PENNSYLVANIA.

CUTTER-HEAD FOR WOOD-WORKING.

SPECIFICATION forming part of Letters Patent No. 238,074, dated February 22, 1881.

Application filed October 20, 1880. (No model.)

*To all whom it may concern:*

Be it known that I, GEORGE W. AMESBURY, of the city and county of Philadelphia, and State of Pennsylvania, have invented a certain new and useful Improvement in Molding or Matching Cutter-Heads for Grooving and Tonguing Lumber; and I do hereby declare the following to be a sufficiently full, clear, and exact description thereof, and of the mode of using the same, to enable others skilled in the art to make and use the said invention.

The object of this invention is to afford a prompt and ready means of adjusting the cutters to adapt them to different thicknesses of lumber without the trouble of adjusting each separate bit or cutter, thus insuring the most perfect working of the cutters and entirely equal action thereof, and a smooth finish in the product, with the least trouble and care in making adjustment.

The nature of my invention consists in forming the cutter-head of two parts, which comprise interlocking segments, in each of which is placed and secured a cutting-bit, preferably made to embrace not only the tongue or groove in the lumber, but also the contiguous material on each side thereof. These cutters are made adjustable in the direction of their shaft-axis of rotation by means of a series of racks or segments of screw-threads engaging in a nut turning upon the same shaft-axis of rotation, whereby they control and regulate the movable part of the cutter-head.

I will now proceed to describe particularly and in detail the mode of making and using this invention, referring in so doing to the drawings annexed, and forming a part of this specification.

Figure 1 shows a plan; Fig. 2, the parts separated in perspective, and Fig. 3 a sectional elevation of the invention. Fig. 4 is an elevation, partly in section.

The same letters of reference apply to the same parts in the several figures.

A represents the fixed member of the cutter-head, which when in use is securely attached to the driving or revolving shaft by means of a set-screw, $a$, and contains cutters B and B', secured adjustably therein by set-screws C and C'. The movable member D of the cutter-head is formed so as to slide up and down in the direction of the axis of the revolving shaft, and is provided with segments or jaws E, which contain cutters G and G', retained in position by set-screws F and F', which segments interlock with similar segments in fixed member A of the cutter-head. A series of two or more equidistantly-placed rods, H, pass from the movable member D of the cutter-head through opening in the fixed member A of the cutter-head, and are guided above by grooves formed therein. Upon the outer side of the rods H are formed segments of screw-threads, which engage in a nut, J, bearing upon the fixed member A of the cutter-head, and held down thereon by a jam or lock nut, K, screwed upon the hub of the member A, and secured in position by a set-screw, $k$.

L represents an adjusting-screw, fitting in a plug, M, inserted in the upper end of the hub. The purpose of this screw is to adjust the whole head on the shaft or spindle to which it is secured.

The construction of this cutter-head, as just described, is such that when once the cutters are arranged in equilibrium they will remain so during any adjustments made for varying thicknesses, and are not liable to accidental derangement, and are capable of exact and accurate fitting at a low cost upon all of their working or operative surfaces.

To adjust this cutter-head it is simply necessary, after having loosened nut K, to turn the nut J to the right or left, as it may be desired, to produce a greater or less thickness between the cut made by the two series of cutters in the members A and D, the rods H moving them in parallel position. When the adjustment is made, the nut K is then screwed fast against nut J, holding the latter in its adjusted position, and preventing slipping of the latter. The nut K operates both as a stop-collar and jam or lock nut combined. When loosened slightly, it permits the nut J to be rotated without working off the thread on the guide-rods, thus compelling a longitudinal movement of said rods, while said nut J turns in a horizontal plane. Said nut K thus acts as a stop-collar for nut J. When the required adjustment of the movable member of the cutter-head has been obtained, the nut K is screwed down fast against the nut J, holding the latter fast in position. In this case the nut K acts as a lock or jam nut.

Having described my invention and the mode of operating the same, what I claim therein as new is—

1. In an adjustable cutter-head for molding and matching lumber, a fixed cutter-head provided with mortised segments adapted to receive and retain straight cutters or bits, in combination with a movable cutter-head, also provided with similar mortised segments interlocking with those of the fixed head, and retained in relative adjustment therewith by rods fixed in the movable head fitting in apertures in the fixed head, and the operating-nut J and locking-nut K, as and for the purpose set forth.

2. In an adjustable cutter-head for molding and matching lumber, the combination of a movable cutter-head, provided with jaws adapted to receive and retain cutters, interlocking with similar jaws in a fixed cutter-head, with a series of tooth rods or racks fixed in the movable head, extending through the fixed head and engaging in a nut, as and for the purpose set forth.

GEORGE W. AMESBURY.

Witnesses:
J. DANIEL EBY,
ALEX. H. SIEGEL.